(12) United States Patent
Schaenzer et al.

(10) Patent No.: US 7,364,063 B2
(45) Date of Patent: Apr. 29, 2008

(54) THERMALLY COUPLING AN INTEGRATED HEAT SPREADER TO A HEAT SINK BASE

(75) Inventors: Matthew J. Schaenzer, Phoenix, AZ (US); Thomas J. Fitzgerald, Phoenix, AZ (US); Tim A. Renfro, Mesa, AZ (US); Manjit Dhindsa, Phoenix, AZ (US); Vaibhav P. Trivedi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 361 days.

(21) Appl. No.: 10/914,359

(22) Filed: Aug. 9, 2004

(65) Prior Publication Data
US 2006/0027635 A1   Feb. 9, 2006

(51) Int. Cl.
*B23K 31/02* (2006.01)
(52) U.S. Cl. .............................. 228/179.1; 228/234.1; 228/246
(58) Field of Classification Search ...................... None
See application file for complete search history.

(56) References Cited

U.S. PATENT DOCUMENTS

| 4,995,546 | A * | 2/1991 | Regnault ................. 228/123.1 |
| 6,324,072 | B1 * | 11/2001 | Lorenz et al. .............. 361/803 |
| 2002/0043402 | A1 * | 4/2002 | Juskey et al. ............... 174/260 |
| 2002/0105071 | A1 * | 8/2002 | Mahajan et al. ............ 257/720 |
| 2002/0114963 | A1 * | 8/2002 | Petkie ......................... 428/472 |
| 2005/0280142 | A1 * | 12/2005 | Hua et al. ................... 257/707 |
| 2006/0051898 | A1 * | 3/2006 | Lu et al. ..................... 438/121 |
| 2006/0227510 | A1 * | 10/2006 | Fitzgerald et al. .......... 361/704 |

* cited by examiner

*Primary Examiner*—Kiley Stoner
(74) *Attorney, Agent, or Firm*—Trop, Pruner & Hu, P.C.

(57) ABSTRACT

The base of a heat sink may be selectively plated with a solder wetting material and soldered to an integral heat spreader also selectively plated with gold. In another embodiment, the solder may be applied in the form of an insert made up of an electrical heating wire sandwiched between indium foil which acts as solder when heated by the intervening wire.

15 Claims, 4 Drawing Sheets

THERMALLY COUPLING AN INTEGRATED HEAT SPREADER TO A HEAT SINK BASE

BACKGROUND

This invention relates generally to techniques for removing heat from integrated circuits.

Integrated circuits may develop considerable amounts of heat during operation. This heat build up may adversely affect the electronic device using those components, the components themselves, and other surrounding components.

Thus, it is desirable to dissipate heat from electronic components as effectively as possible. To this end, conventionally, a heat sink is positioned over an integrated circuit package. The heat sink may include fins. The electronic device may include a fan which blows air over the heat sink in some cases.

The interface between the heat sink and the integrated circuit may be facilitated by having an integral heat spreader. The integral heat spreader may be thermally coupled to the heat sink base. A thermal interface material may be utilized between the heat sink base and the integral heat spreader to improve the heat transfer characteristics from the integrated circuit to the heat sink. Ideally, the thermal interface material reduces the resistance to heat transfer.

Thus, there is a need for better ways to couple integrated circuits through integrated heat spreaders to heat sinks.

DETAILED DESCRIPTION

Figure 1:
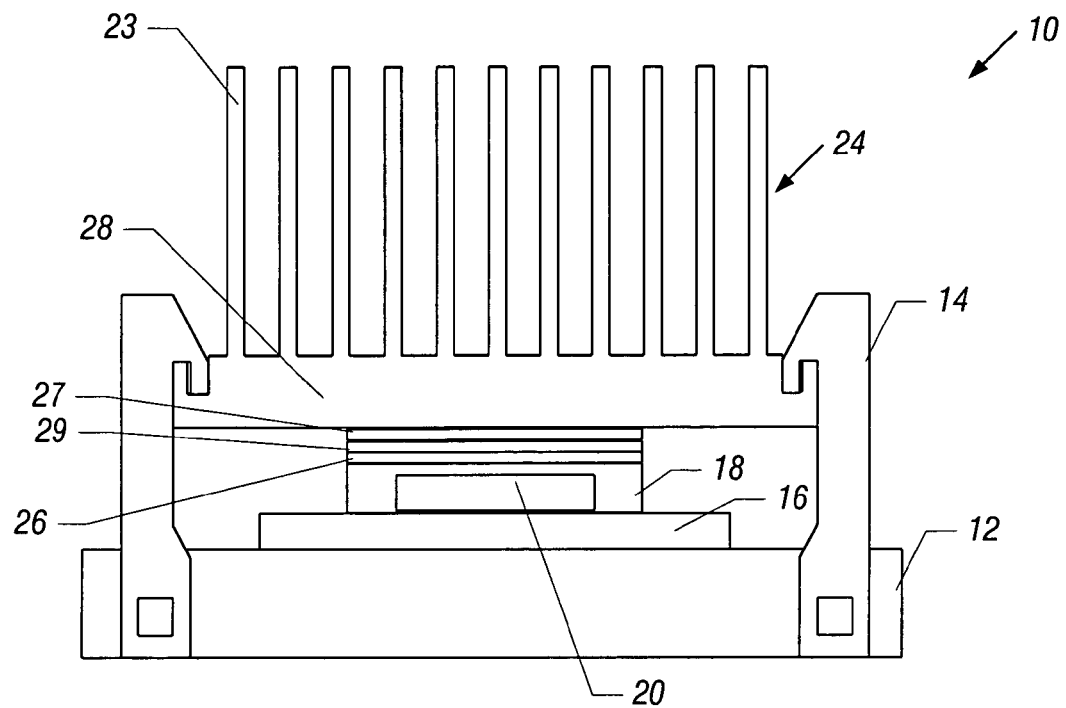
FIG. 1 is an enlarged, cross-sectional view of one embodiment of the present invention.

Referring to FIG. 1, the integrated circuit assembly 10 may include a socket 12 to be attached to a printed circuit board (not shown). The socket 12 may have catches 14 to engage slots in a heat sink 24. The heat sink 24 may include a base 28 and upstanding fins 23 extending away therefrom.

The substrate 16 may be situated over the socket 12. A semiconductor integrated circuit 20 may be plugged into the socket 12. The circuit 20 may be partially surrounded by an integrated heat spreader 18 designed to aid in the transfer of heat from the integrated circuit 20 to the heat sink 24.

The interface between the integrated heat spreader 18 and the base 28 of the heat sink 24 may include a pair of solder wetting layers 26 and 27. The layer 26 may be initially secured to the integral heat spreader 18 and may be formed by selective coating. Likewise, the layer 27 may be initially formed on the base 28 of the heat sink 24 and may be selectively coated thereon.

Figure 2:
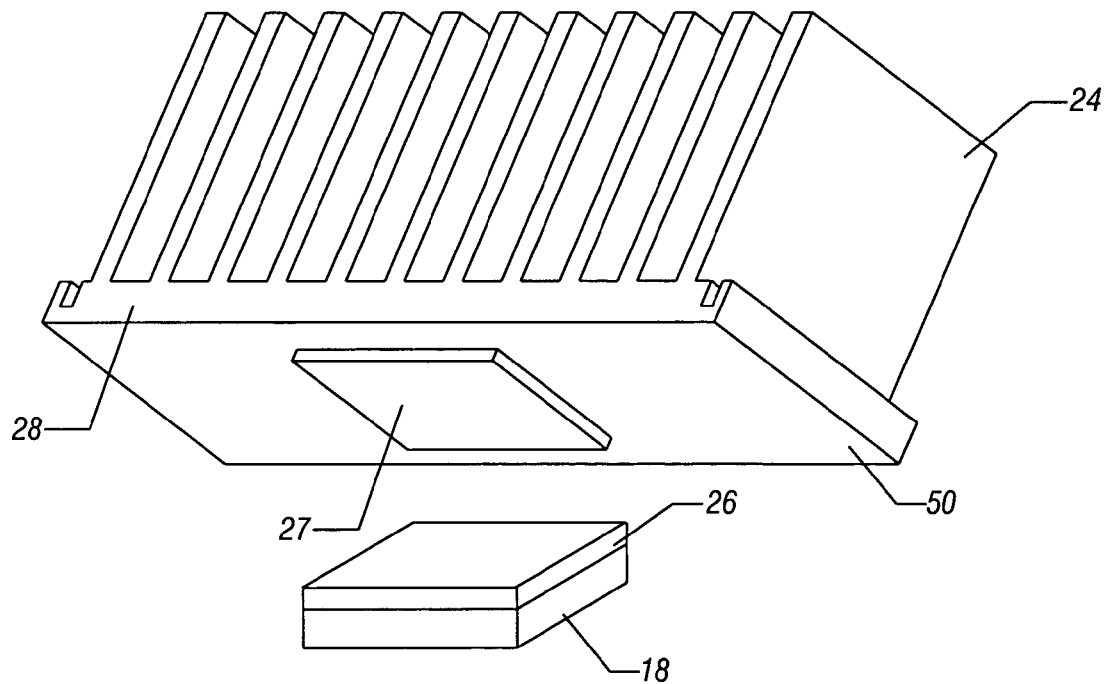
FIG. 2 is an exploded perspective view corresponding to FIG. 1.

Thus, as shown in FIG. 2, the integral heat spreader 18 has its layer 26 and the lower surface 50 of the second level heat sink or heat sink base 28 of the heat sink 24 has a selectively coated layer 27 formed thereon. Thus, when the heat sink 24 is positioned on the integral heat spreader 18, the layers 26 and 27 may be bonded by the solder or thermal interface material 29.

Figure 3:
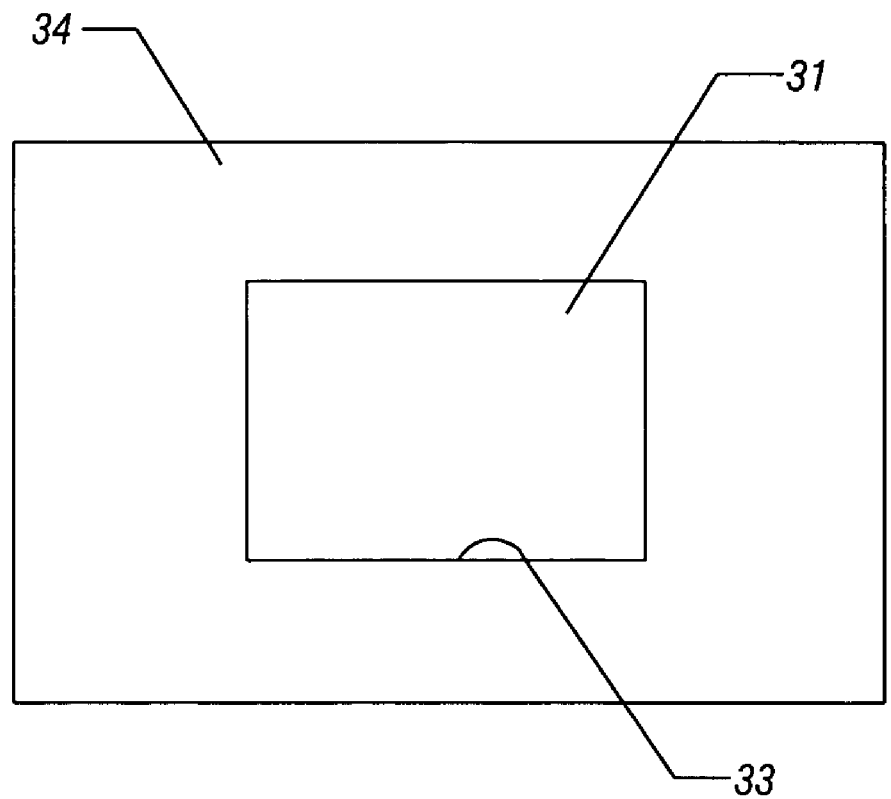
FIG. 3 is a top plan view of the heat sink base shown in FIG. 2 in the course of manufacture.

Referring to FIG. 3, selective deposition of the layer 27 on the surface 31 of the base 28 of the heat sink 24 may be accomplished by masking off the regions not corresponding to the shadow of the integral heat spreader, leaving an opening 33 through which the lower surface 30 appears and a surrounding mask 34. In one embodiment, the mask 34 may be formed of rubber or similar plating masking materials. Once the heat sink 28, other than the region 32, is appropriately protected, the heat sink 24 may be exposed in a gold bath to plate the exposed region 30 with the layer 27.

Figure 4:
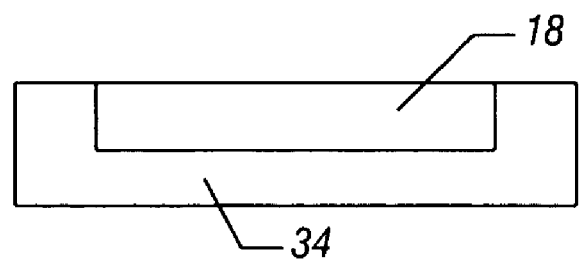
FIG. 4 is a cross-sectional view through the integral heat spreader shown in FIG. 2 in the course of manufacture.

Similarly, as shown in FIG. 4, the lower and side surfaces of the integral heat spreader 18 may be covered with a mask 34. Then the integral heat spreader 18 may be exposed in a gold bath to form the gold layer 26.

In both cases, the mask 34 may be removed from the heat sink 24 and the integral heat spreader 18 prior to combination of the heat sink 24 to the integral heat spreader 18.

Other selective deposition techniques may be utilized as well. For example, a rubber mask may be pressed against the part to be plated and metal may be electroplated or electrolessly plated on surfaces not protected by the mold. The metal may be sprayed on the part. Sputtering may also be used.

By selective plating on the heat sink base 28 and integral heat spreader 18 top surface, improved thermal performance can be achieved without unnecessarily plating solder wetting material over the entire bottom surface of the heat sink base and the entire surface of the integral heat spreader.

The layers 26 and 27 may be formed of material that wets the solder (such as indium solder) used to bond the heat sink 28 to the heat spreader 18. The layers 26 and 27 may be formed of gold, silver, indium, or tin, to mention a few examples. Advantageously, the layers 26 and 27 are formed of a material that does not significantly oxidize.

Gold, as one example, is known to have very good wetting characteristics with thermal interface materials, such as indium solder thermal interface material. Gold may improve the reliability of the interface between the heat sink 24 and the integral heat spreader 18. By controlling the amount of gold and its extent to only the shadow of the integral heat spreader 18 on the base 28, extra gold, which would wet the thermal interface material 29, is avoided.

Typically, nickel is plated on the integral heat spreader and the base of the heat sink. If the layers 26 and 27 were not formed of a solder wetting material, the solder bond would be weaker.

In some embodiments, a dissimilarity is achieved between the wetting characteristics of the selectively plated heat sink area and the non-selectively plated heat sink area, which is generally nickel. As a result, solder or other thermal interface material easily wets and spreads over the selectively plated area. However, the non-selectively plated area will not wet as easily and will, thus, act as a barrier to the further spreading of the solder thermal interface material 29. In some embodiments, by retaining the thermal interface material 29 in the desired area, less thermal interface material may be utilized, pump-out may be reduced, resulting in reliability improvements, and the thermal interface material may be directed to fully fill the gold plated area, improving thermal performance in some embodiments.

Thermal performance may be improved both before and after thermal cycling with a thermal interface material such as indium solder when used with gold plated surfaces. In some embodiments, the gold provides a consistent, robust bonding surface that nickel cannot offer.

By selectively coating a solder wetting material, such as gold, the amount of such material that is utilized is reduced.

For example, in some embodiments, only 30 percent of the entire heat sink base may be coated.

In addition, solder thermal interface material has a thermal performance with gold plating that is much less sensitive to fan heat sink attach force and polymer thermal interface materials. This is due to the filling of the solder and the formation of an intermetallic bond between the gold and the solder thermal interface material. As a result, the attach force has minimal impact on thermal performance. This may enable a reduction in fan-to-heat sink attach force and the resulting reduction in board bending issues.

Figure 5:
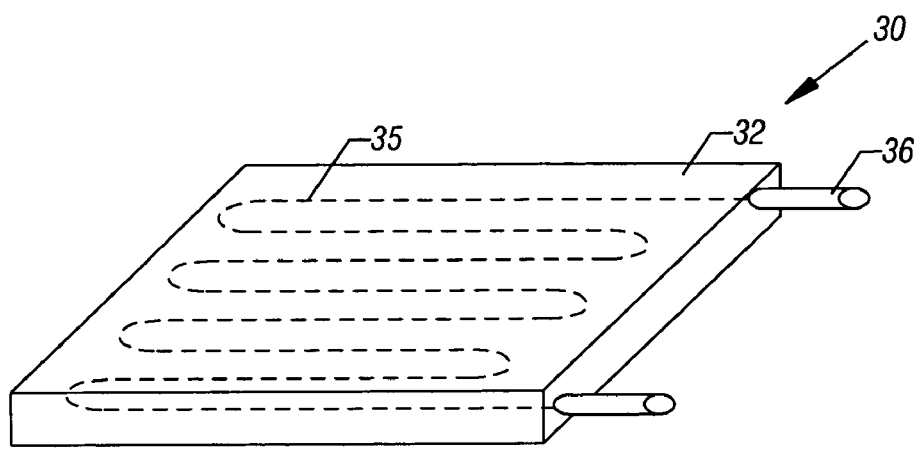
FIG. 5 is a perspective view of a heating device in accordance with one embodiment of the present invention.
Figure 6:
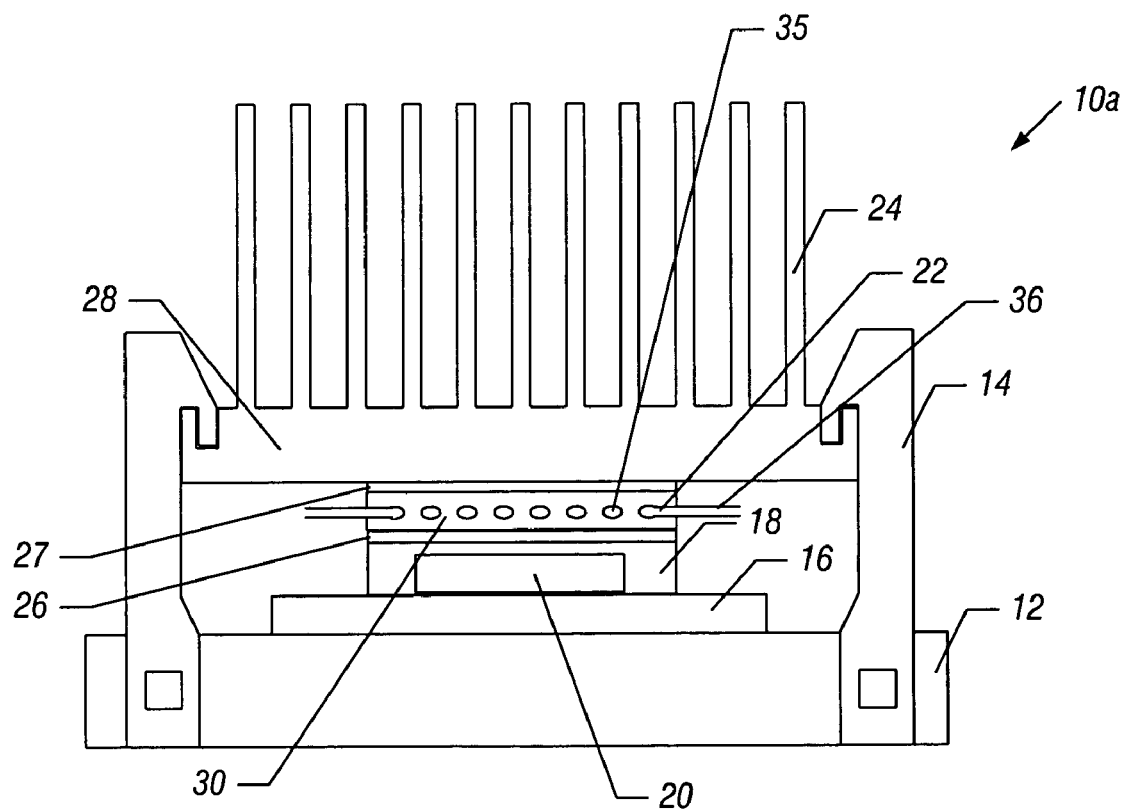
FIG. 6 is an enlarged, cross-sectional view of another embodiment of the present invention.

Referring to FIG. 5, a solder insert 30 may include embedded wire 35. The insert 30 can be placed between a second level heat sink or base 28 and an integral heat spreader 18 of an electronic package 10a as shown in FIG. 6. Electrical current can be applied to the insert 30, and the heating wire 35 liquefies the surface layers 32 of solder thermal interface material. After solidification, in some embodiments, the resulting solder bond line may provide an excellent thermal link between the second level heat sink 28 and the electric package 10a.

The second level heat sink 28 may be clamped by catches 14 to a socket 12 as described previously. A substrate 16, a die 20, and an integral heat spreader 18 may be mounted over the socket 12. Selectively plated layers 27 and 26, as described previously, may be provided.

Figure 7:
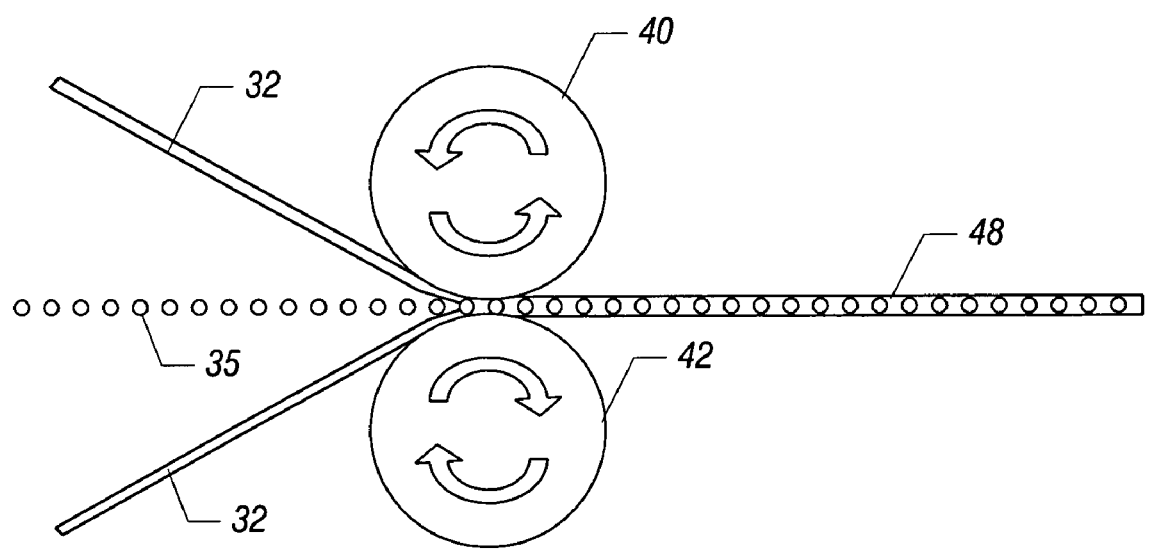
FIG. 7 is a side elevation of a process for making the device shown in FIG. 5 in accordance with one embodiment of the present invention.

Referring to FIG. 7, in one embodiment, the insert 30 may be formed as a sandwich of wire 35 and the layers 32 that may be formed of solder thermal interface foil. The three layers may be joined by rotating rollers 40 and 42 with adhesive application to join the wire 35 to the foil layers 32. The sheet 48 then may be cut to size to form individual inserts 30.

In operation, when electrical current is applied to the wire 35, the layers 32 may be melted. The heating wire 35 may be formed of kanthal or tungsten, in one embodiment of the present invention. In another embodiment, indium foil layers 32 may be attached to the gold layers 26, 27 on an integral heat spreader 18 and the second level heat sink 28 by cold forming. Indium foil layers may also be attached to gold-free surfaces such as nickel surfaces. Thereafter, the insert 30 may be placed between the heat sink 24 and the integral heat spreader 18 in assembled condition to melt the foil layers 32 and to reflow the solder. It may be desirable to coat the wire 35 with an electrically insulating layer (not shown), such as a polymer, including epoxy or colloidal silica in advance. In one embodiment, the insulating layer only needs to withstand the melting point of indium, which is 171° C.

In some embodiments, an efficient way of melting the solder thermal interface material in place is provided. In this way, it is not necessary to heat the entire setup, including the integrated circuit die 20, which may be damaged by the heating. It also allows easy heat sink attachment in the assembled state. There is no need to preheat the second level heat sink or the assembly in an oven in some embodiments. Liquid metal will flow into all of the small interfaces between the integral heat spreader and the second level heat sink, ensuring good thermal contact in such embodiments. In some embodiments, the insert 30 enables the heat sink 24 to be removed and reworked when needed.

Using indium as a thermal interface material, rather than polymer, may reduce the thermal resistance of the second level heat sink by approximately one-third. This may allow the use of extruded aluminum technology for the second level heat sink, avoiding the use of copper and other more expensive second level heat sinks. The presence of the heating wire can act as a spacer to control the second level thermal interface bond line, reducing the tendency of the solder to be squeezed out of the bone line.

In accordance with another embodiment of the present invention, the insert can be utilized with a polymer solder hybrid. The polymer solder hybrid needs to be reflowed before use to melt the indium in the hybrid. The heating elements can also be used to cure or crosslink the polymer in the polymer solder hybrid. The insert may also be used to cure crosslinked conventional polymer second level thermal interface materials, thereby reducing pump-out issues associated with non-crosslinked thermal interface materials.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   providing an insert between a solder wetting material on a heat sink and heat spreader; and
   applying heat from a heating wire between a pair of solder foils between an integrated circuit and a heat transfer device to cause soldering of material between said heat transfer device and said integrated circuit.

2. The method of claim 1 including selectively plating the base of the heat sink using a masking technique.

3. The method of claim 1 including plating an area of the base of a heat sink corresponding to the profile of an integral heat spreader.

4. The method of claim 3 including selectively plating an integral heat spreader.

5. The method of claim 4 including bonding the solder wetting material on the heat sink to the solder wetting material on the integral beat spreader through a thermal interface material.

6. The method of claim 5 including bonding using a solder.

7. The method of claim 6 including using a solder that wets a solder wetting material more than it wets the surrounding heat sink.

8. The method of claim 1 including melting the solder foils by applying current to said wire and thereby bonding said insert to said integral heat spreader and said heat sink.

9. The method of claim 1 including selectively plating the base of a heat transfer device in the form of a heat sink with a solder wetting material.

10. The method of claim 9 including applying a gold layer to an integral heat spreader and a heat sink base and applying heat from between the interface between said layers to solder said layers together.

11. A method comprising:
    providing an insert between a solder wetting material on a heat sink and heat spreader, said insert including a heating wire between a pair of solder foils.

12. The method of claim 11 including selectively plating the heat sink using a masking technique.

13. The method of claim 11 including plating an area of the heat sink corresponding to the profile of an integral heat spreader.

14. The method of claim 13 including selectively plating an integral heat spreader.

15. The method of claim 14 including melting the solder foils by applying current to said wire and thereby bonding said insert to said integral heat spreader and said heat sink.

* * * * *

UNITED STATES PATENT AND TRADEMARK OFFICE
CERTIFICATE OF CORRECTION

PATENT NO. : 7,364,063 B2  Page 1 of 1
APPLICATION NO. : 10/914359
DATED : April 29, 2008
INVENTOR(S) : Matthew J. Schaenzer et al.

It is certified that error appears in the above-identified patent and that said Letters Patent is hereby corrected as shown below:

Column 4, line 33, "beat" should be --heat--.

Signed and Sealed this

Fifth Day of August, 2008

JON W. DUDAS
*Director of the United States Patent and Trademark Office*